W. K. OMICK.
SHEATH FOR VEHICLE WHEELS.
APPLICATION FILED MAY 21, 1910.

985,538.

Patented Feb. 28, 1911.

Witnesses
O. B. Baenziger.
Vera Pillman.

Inventor
William K. Omick
Parker W Burton
Attorneys

UNITED STATES PATENT OFFICE.

WILLIAM K. OMICK, OF DETROIT, MICHIGAN.

SHEATH FOR VEHICLE-WHEELS.

985,538.  Specification of Letters Patent.  Patented Feb. 28, 1911.

Application filed May 21, 1910. Serial No. 562,585.

*To all whom it may concern:*

Be it known that I, WILLIAM K. OMICK, a citizen of the United States, residing at Detroit, county of Wayne, State of Michigan, have invented a certain new and useful Improvement in Sheaths for Vehicle-Wheels, and declare the following to be a full, clear, and exact description of the same, such as will enable others skilled in the art to which it pertains to make and use the same, reference being had to the accompanying drawings, which form a part of this specification.

This invention relates to sheaths for vehicle wheels.

It has for its object an improved metallic sheath adapted to be secured over the rubber part of the pneumatic tire, and to protect the same.

It also furnishes a pegged tread enabling the wheel to secure good traction hold on the ground.

Figure 1:
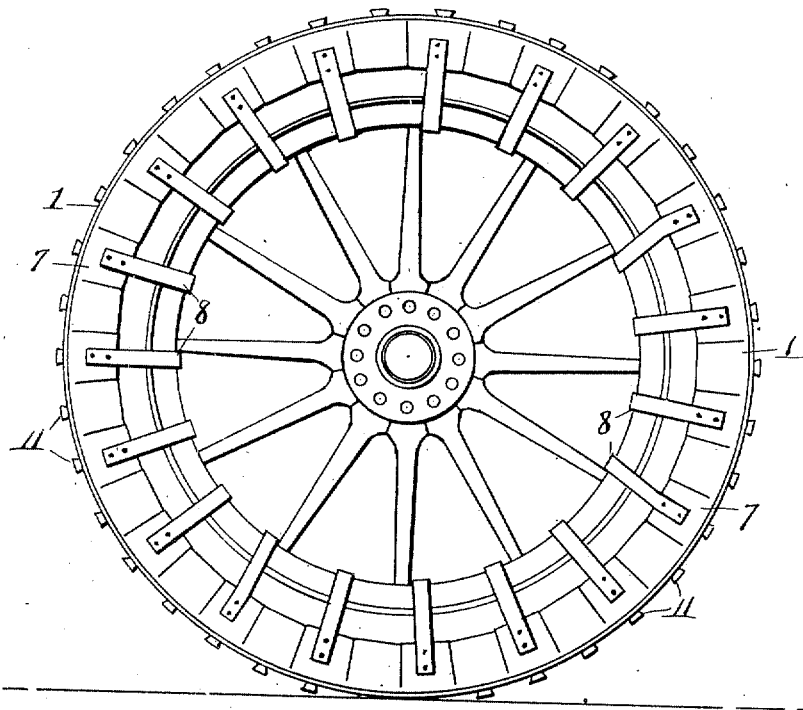
Figure 2:
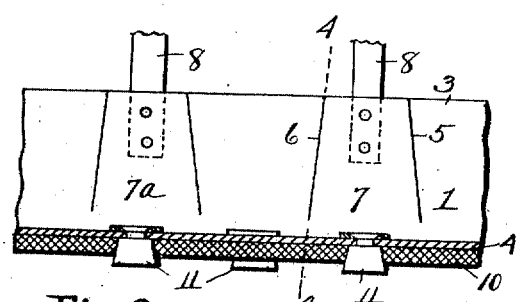
Figure 3:
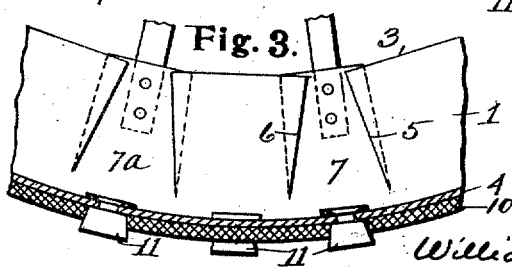
Figure 4:
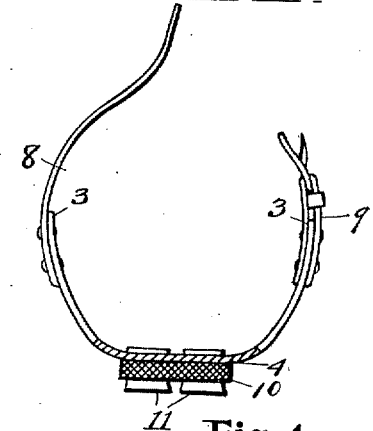

In the drawings:—Figure 1, is a side elevation of the wheel protected by the sheath. Fig. 2, is a longitudinal section of the sheath in straight form. Fig. 3, is a section of the portion in the form it assumes when curved around the wheel. Fig. 4, is a cross section.

The sheath consists of a strip of metal 1, bent in a troughed or grooved form, and with the side flanges slit at regular intervals from the edges 3 to the bottom of the curve.

The tread part 4 is left unsevered. When the metal is bent around the wheel the edges of the slits 5 and 6 overlap, and to each alternate section 7, 7ª, are secured by rivets or by some other way holding straps 8 and 9, one of which is provided with a buckle or other suitable device, and the two straps on opposite sides of the wheel are brought together with the tire included between the bend of the straps and the buckles are drawn tight, thereby securing the entire sheath securely to the wheel and tightening the engagement of the overlapping flange portion to the edges of the adjacent portions which it overlaps. Around the tread external to the metal part 4 is an outer tread, preferably of textile material, leather or rubber which is secured to the metal part of the tread by rivets 11, the outer end of which rivets are left large in the form of heads projecting beyond the textile leather or rubber part 10 of the sheath. The slits 5 and 6 allow the curved sheath to yield as the wheel turns preserving the utility of the flattened part of the tread which is immediately in contact with the earth while protecting the tire itself from direct contact with the earth or articles upon the earth which might injure it, and also presenting the holding points 11 which may be renewed at small cost at any time, as also may the band 10 of textile leather or rubber material, which forms the actual tread surface of the assembled structure.

What I claim is:

A sheath for pneumatic tires, comprising a tread portion, and extended side flanges having slits cut therein, the portions intervening between the slits alternately partially underlying and overlapping one another, straps attached to each overlapping portion, adapted to engage about the wheel rim, whereby the unstrapped portions are secured in close relation to the tire, and whereby such a connection is afforded as to render the sheath flexible when contacting with the ground, substantially as described.

In testimony whereof, I sign this specification in the presence of two witnesses.

WILLIAM K. OMICK.

Witnesses:
 CHARLES F. BURTON,
 VIRGINIA C. SPRATT.

---

Copies of this patent may be obtained for five cents each, by addressing the "Commissioner of Patents, Washington, D. C."